F. Y. McKINSTRY.
OVERHEAD AND UNDERGROUND STORAGE FOR AUTOMOBILES.
APPLICATION FILED JAN. 17, 1921.
1,394,999.
Patented Oct. 25, 1921.
2 SHEETS—SHEET 1.
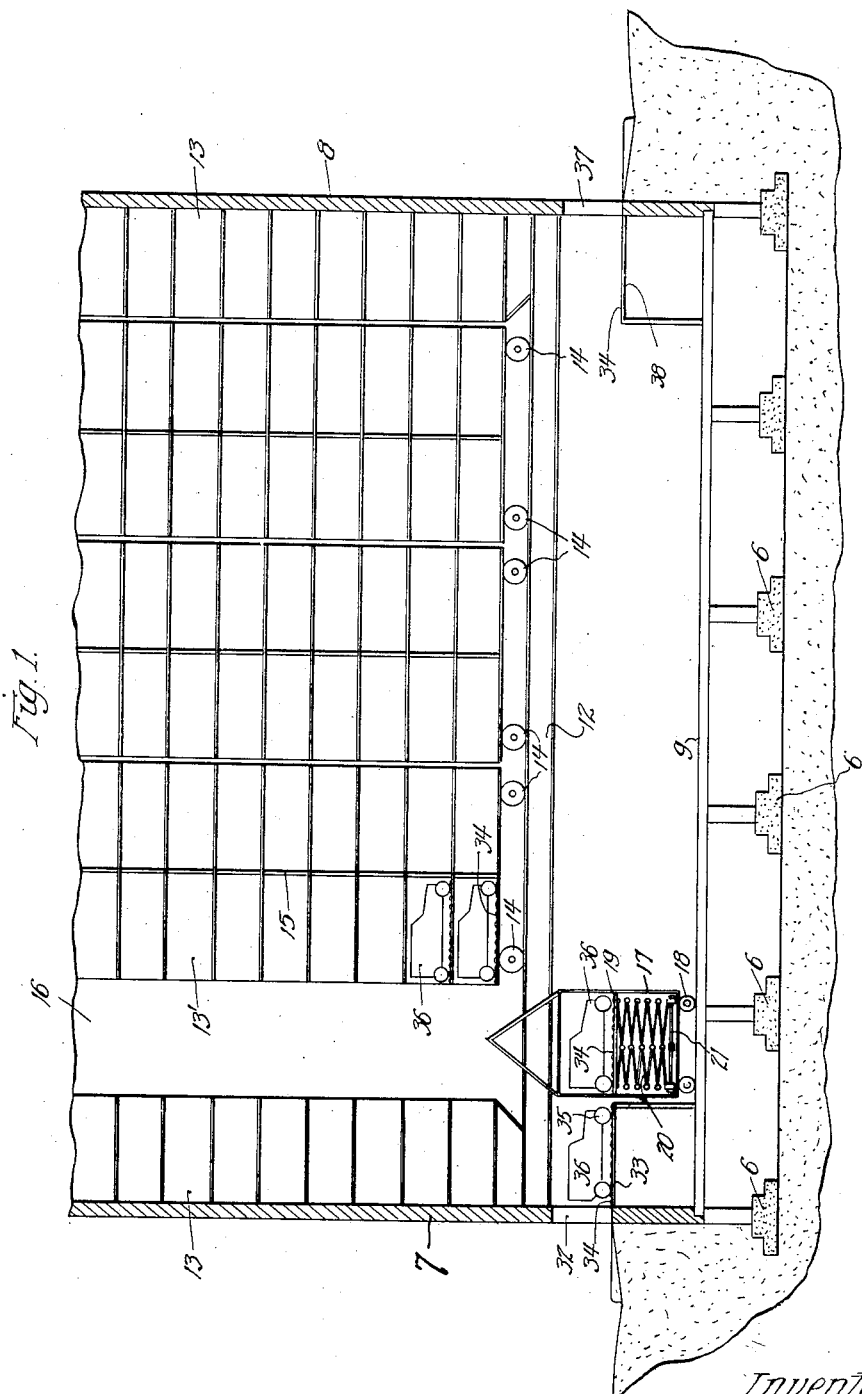
Inventor.
Frank Y. McKinstry.
By Gabel + Mueller
Attys

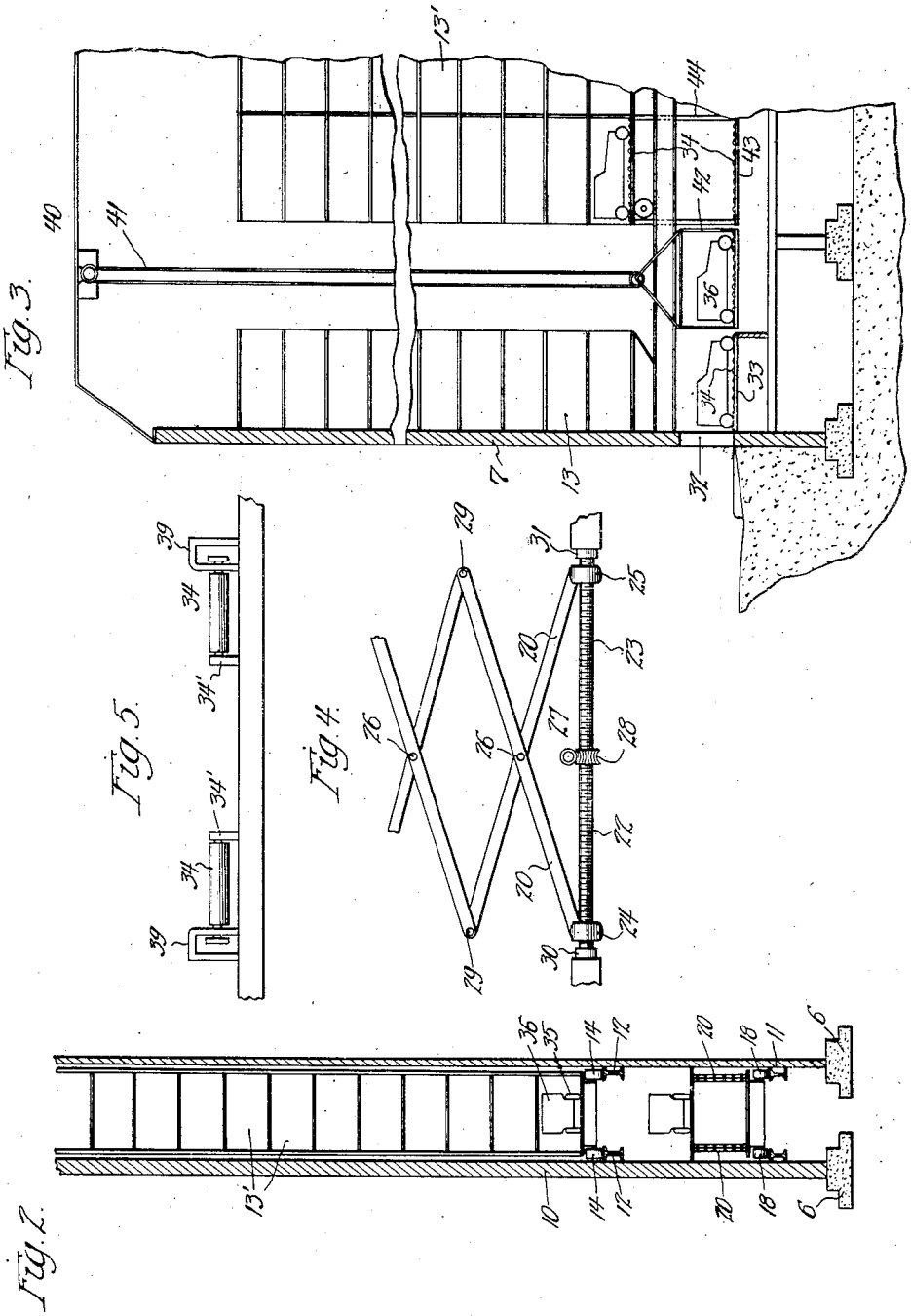

UNITED STATES PATENT OFFICE.

FRANK Y. McKINSTRY, OF CHICAGO, ILLINOIS.

OVERHEAD AND UNDERGROUND STORAGE FOR AUTOMOBILES.

1,394,999.   Specification of Letters Patent.   Patented Oct. 25, 1921.

Application filed January 17, 1921. Serial No. 437,811.

*To all whom it may concern:*

Be it known that I, FRANK Y. McKINSTRY, a citizen of the United States, residing at Chicago, in the county of Cook and State of Illinois, have invented a certain new and useful Improvement in Overhead and Underground Storage for Automobiles, of which the following is a full, clear, concise, and exact description, reference being had to the accompanying drawings, forming a part of this specification.

This invention relates to overhead and underground storage for automobiles and more particularly to means for storing automobiles on a plurality of levels so as to use a minimum of space for storing the same, and wherein the automobile can be handled in a dormant or "dead" condition.

It is a purpose of the invention to provide a storage place for automobiles that is so constructed that there is no necessity to touch the operating mechanism of the automobile in order to move the same into the berth it is to occupy in the storage place, and from which the same can be delivered in the same manner. This would avoid the necessity of men with dirty clothing occupying the seats of the automobiles when being moved into position and closed cars could be locked if desired prior to entering the storage house.

It is a further purpose of the invention to move the motor cars into and out of their berths in the storage place by means of power driven rollers provided with suitable guide means to prevent any of the motor car parts such as the fenders or mud guards from coming into contact with any of the parts of the building, and thus avoid possible injury thereto.

It is another purpose of the invention to provide a storage building of the above mentioned character that is constructed entirely of fireproof material, said building being provided with a plurality of storage compartments, suitably ventilated to insure dryness, and which is so constructed that there would be no engine gases or smoke accumulated therein, as there would be no necessity of running the engine of the automobile while in the building.

It is also a purpose of the invention to so construct the said storage place that there is a minimum of lost space therein and that only a small operating force is required.

It is still a further object of the invention to provide a storage place for automobiles, comprising units having a plurality of vertically superimposed automobile receiving compartments and to provide means for moving an automobile from an entrance level to any one of said compartments and from any one of said compartments to an exit level.

It is another object of the invention to provide an automobile storage place having sections comprising fixed end tiers of receiving compartments, and intermediate movable tiers of compartments and a single means for moving an automobile from an entrance level to any one of the compartments of any of said tiers and from any one of said compartments to an exit level, said means comprising an elevator that is adapted to be moved horizontally, lengthwise of said section as well as vertically between said tiers, or to provide elevators in permanent horizontal positions in line with the spaces between said tiers and movable vertically in said spaces.

It is still a further object of the invention to provide a storage device of the above mentioned character wherein the movable tiers of compartments can be moved horizontally on a track toward and away from each other and toward and away from the fixed tiers to provide spaces therebetween for the operation of the elevators as desired.

Other objects and advantages of the invention will appear as the description of the accompanying drawings proceeds, said drawing showing certain forms that my invention may take. However, I desire to have it distinctly understood that I do not intend to limit myself to the exact details shown and described but that I intend to include as part of my invention all such obvious changes and modifications as would occur to a person skilled in this art and as would fall within the scope of the claims.

In the drawings:

Figure 1 is a longitudinal vertical section of the storage structure partly broken away;

Fig. 2 is a transverse vertical section of a portion thereof;

Fig. 3 is a fragmentary longitudinal vertical section of a modified structure;

Fig. 4 is a fragmentary detail view of a modified structure;

Fig. 5 is an enlarged fragmentary detail view of one of the guide rollers.

The improved storage place for automobiles or similar vehicles comprises the supporting piers 6, the end walls 7 and 8 and the side walls, one of which is shown at 10. The piers 6 support the walls 7, 8 and 10 and the partitions 11. Supported by the walls 7 and 8, the side wall 10 and the partitions 11 are tracks 9, the purpose of which will be later explained. The side wall 10 and partitions 11 are adapted to support rails 12, which rails are also supported by the end walls 7 and 8. The end walls 7 and 8 and the side walls and partitions also support a plurality of individual storage compartments 13 which are arranged in vertically extending tiers, one adjacent each of the walls 7 and 8, each of the tiers forming a storage unit as will be later explained. Mounted upon the rails 12 and supported upon the wheels or rollers 14 are storage units comprising individual storage compartments 13' similar to the compartments 13, an end wall or partition 15 being provided between the compartments 13', each of the units comprising two tiers of compartments 13' arranged back to back. Each of these units is movable lengthwise of the rails 12 upon the wheels 14, and the total length of the movable units is less than the distance between the opposite ends of the units comprising the compartments 13 so that a space 16 will be provided between certain of the units, the space being located between any pair of adjacent units due to the fact that these can be moved about on the rails 12 to provide the space wherever desired.

On the track 9 is provided a framework 17 provided with wheels 18 that are adapted to move on the track 9 and the framework 17 is provided with a vehicle support 19 which is adapted to be moved in a direction toward or away from the bottom of the framework 17 by means of the pivotally connected members 20 which form a sort of lazy tongs adapted to be extended and retracted. This is accomplished by means of the screw device shown at 21 which comprises the oppositely screw-threaded portions 22 and 23 engaging with the screw-threaded eyes 24 and 25 at the lower end portions of the lowermost end members 20 pivotally connected to each other at 26. The oppositely screw-threaded members 22 and 23 are driven by means of the worm 27 engaging with a worm wheel 28, and it will be noted that when the screw device 21 is operated in one direction the members 24 and 25 will approach each other, the pivot points 26 will rise, and the pivots 29 at the ends of the links will also approach each other, while if the direction of turning of the screw 21 is reversed the eyes 24 and 25 will move away from each other.

In order to limit the downward movement of the platform 19 the stops 30 and 31 are provided on the operating device for the lazy tongs. The end wall 7 is provided with an opening 32 through which the vehicle is adapted to enter upon a support 33 which is provided with power driven rollers 34 upon which the wheels 35 of the vehicle 36 are adapted to rest. As these rollers are driven by any suitable means, which is not shown in the drawings, the vehicle can be moved either forwardly or rearwardly depending upon the direction of rotation of the rollers. The vehicle 36 can thus be moved forwardly upon the platform 19 of the elevator. The platform 19 is also provided with rollers 34 similar to the rollers on the entrance way.

It will be seen that the vehicle can be raised to any desired level by means of the elevator device which will operate in the space 16 between adjacent vertical tiers of the individual compartments 13 or 13', and it is in this way the vehicle can be moved into any one of the compartments as desired, the same being moved either forwardly or rearwardly off the elevator by means of the power driven rollers 34. Each of the compartments 13 and 13' is also provided with rollers 34 similar to those previously described which can be driven in either direction to move the vehicle either into or out of the compartment as desired. As the movable units can be moved horizontally as desired, and as the elevator device can be moved horizontally as desired, the elevator can be moved so as to be in line with the space between adjacent sections or units of the storage structure as desired, and in that way a vehicle can be transferred to any one of the compartments or can be removed therefrom in a similar manner. An exit opening is provided at 37 in the wall 8 and a supporting platform 38 is provided adjacent the exit 37, rollers 34 being provided on this platform as in the case of the platform 33.

It will of course be evident that the opening 37 can be used either as an entrance or exit or the opening 32 could be used for either purpose. Each of the individual storage compartments 13 or 13' is provided with any suitable ventilating means desired, these not being shown in the drawings for the sake of clearness.

In order to properly guide the vehicle while on the rollers 34 suitable guide means 39 adapted to be engaged by the wheels 35 is provided adjacent the rollers 34. The rollers 34 are provided with suitable supports 34' in which they are journaled, the other ends thereof being journaled in the guides 39.

In Fig. 3 is shown a slightly modified structure in which an elevator is shown as being supported from the roof 40 by means of the cable 41, the elevator being shown at 42, and this elevator is provided with rollers 34 as previously described. In other respects the structure is substantially the same as that shown in Figs. 1 and 2, the principal difference being that the elevators are not movable horizontally but are permanently mounted so as to move in a predetermined vertical path, one elevator being provided for each of the spaces that can be arranged between the adjacent units of the storage device, it being of course understood that suitable runways must be provided for the vehicle so that the same can be brought to the entrance of the building from the proper elevator and from the entrance to this elevator, these being shown at 43 in the drawings. One of the supports 43 is provided for each of the movable sections 13' and is movable therewith, so that as said sections are moved into positions of adjacency a complete runway is formed, said supports 43 being hung from the member 13' by means of brackets 44.

It is of course understood that the elevators in Fig. 3 are moved to the tops of the shafts when not in use, where the elevators and cables 42 will not interfere with the moving of the storage units, as the cable 41 will be wound on a suitable drum and will be out of position between the adjacent units.

Having thus described my invention what I claim as new and desire to secure by U. S. Letters Patent is:

1. A building structure of the character described comprising a plurality of sections, each of said sections comprising a plurality of structural units arranged in a row, the end ones of said units being fixed and the intermediate ones of said units being movable to provide a space between adjacent units, each of said units comprising a vertical tier of individual storage compartments, and means for moving vehicles to any one of said compartments.

2. A building structure of the character described comprising a plurality of sections, each of said sections comprising a plurality of structural units arranged in a row, the end ones of said units being fixed and the intermediate ones of said units being movable to provide a space between adjacent units, each of said units comprising a vertical tier of individual storage compartments, and an elevator vertically movable in said space between said units.

3. A building structure of the character described comprising a plurality of sections, each of said sections comprising a plurality of structural units arranged in a row, the end ones of said units being fixed and the intermediate ones of said units being movable to provide a space between adjacent units, each of said units comprising a vertical tier of individual storage compartments, and an elevator vertically movable in said space between said units and horizontally movable into position in line with said space.

4. In a building structure of the character described, a front wall, a rear wall, a storage unit supported by each of said walls, each of said storage units comprising a vertically arranged tier of individual storage compartments, a pair of rails extending between said walls, and a plurality of storage units mounted to move on said rails, an entrance way below said storage units, and means for transferring a vehicle from said entrance way to any one of said compartments.

5. In a building structure of the character described, a front wall, a rear wall, a storage unit supported by each of said walls, each of said storage units comprising a vertically arranged tier of individual storage compartments, a pair of rails extending between said walls, and a plurality of storage units mounted to move on said rails, each of said units comprising two tiers of individual storage compartments arranged back to back, an entrance way below said storage units, and means for transferring a vehicle from said entrance way to any one of said compartments.

6. In a building structure of the character described, a front wall, a rear wall, a storage unit supported by each of said walls, each of said storage units comprising a vertically arranged tier of individual storage compartments, a pair of rails extending between said walls, and a plurality of storage units mounted to move on said rails, each of said units comprising two tiers of individual storage compartments arranged back to back, an entrance way below said storage units, and means for transferring a vehicle from said entrance way to any one of said compartments, said means comprising a track arranged below said rails and an elevator movable along said track below said units, and having a vehicle support movable vertically between any adjacent pair of said units.

In witness whereof, I hereunto subscribe my name this 3rd day of January, A. D. 1921.

FRANK Y. McKINSTRY.